Figure 1:
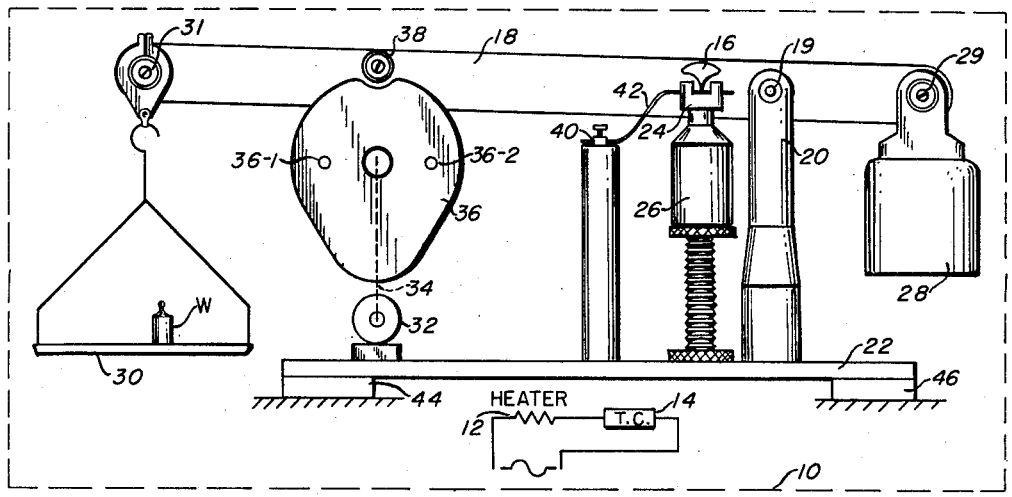

Sept. 29, 1964  E. J. PAPSIS  3,150,523
ELECTRO-MECHANICAL APPARATUS FOR DETERMINING CUT THROUGH
CHARACTERISTICS ON INSULATED WIRE
Filed March 23, 1961  3 Sheets-Sheet 1

INVENTOR.
EDWARD J. PAPSIS
BY
ATTORNEY

Sept. 29, 1964 E. J. PAPSIS 3,150,523
ELECTRO-MECHANICAL APPARATUS FOR DETERMINING CUT THROUGH
CHARACTERISTICS ON INSULATED WIRE
Filed March 23, 1961 3 Sheets-Sheet 2

INVENTOR.
EDWARD J. PAPSIS
BY *Henry L. Hanson*
ATTORNEY

INVENTOR.
EDWARD J. PAPSIS
BY
ATTORNEY

United States Patent Office 3,150,523
Patented Sept. 29, 1964

3,150,523
ELECTRO-MECHANICAL APPARATUS FOR DETERMINING CUT THROUGH CHARACTERISTICS ON INSULATED WIRE
Edward J. Papsis, Dedham, Mass., assignor to Minneapolis-Honeywell Regulator Company, Minneapolis, Minn., a corporation of Delaware
Filed Mar. 23, 1961, Ser. No. 97,945
2 Claims. (Cl. 73—101)

A general object of the present invention is to provide a new and improved apparatus for testing characteristics of an electrical wire having insulation thereon. More specifically, the present invention is concerned with a new and improved apparatus for testing the cut-through characteristics of insulation on an electrical wire wherein the tester is characterized by its simplicity, its reliability and the speed with which it can produce the desired results.

In certain types of electrical wiring applications, it is desirable to use a wiring technique sometimes referred to as "a wire-wrap" technique. This type of wiring technique involves the utilization of electrical terminals around which a connecting wire is wrapped to form an electrical connection. Instead of arranging the terminal so that the joint is to be soldered, the terminal is instead formed with rectangular cross-section such that as the wire is wrapped around the terminal, the wire tends to set up certain stresses and forces between the terminal and the wire so as to form a very firm electrical connection that does not require soldering. In a complex system utilizing wire-wrap techniques, it is frequently required that vast numbers of wires be threaded through a maze of wiring terminals with connections being made to the terminals only at the ends of the wires. These wires must carry an insulation which will prevent electrical short-circuit conditions from developing between adjacent wires and more particularly with respect to the sharp edges of the terminals around which the wire must pass in its path between two connecting terminals.

Thus, it has been found that electrical insulation on wire used in a complex wiring maze employing wire-wrap techniques must be capable of withstanding certain forces and deteriorating conditions which are known to exist as the insulated wire is threaded through the maze. As plastic-like insulating materials are frequently used in insulating wires, the cold flow characteristics of the insulation must be evaluated in order to determine the ability of the insulation to withstand cutting forces when in normal use. Consequently, the present invention is concerned with a testing apparatus capable of evaluating the cold flow or cut-through characteristics of insulation on a wire.

The basic principle of operation employed in the present invention is the use of a knife edge having a particular characteristic which is adapted to be biased against the wire having the insulation thereon so that the knife edge will tend to force its way through the insulation into engagement with the wire on the inside. Methods employed heretofore have been extremely complex and have required amounts of time on the order of weeks in order to effect an evaluation which was not as reliable or consistent as the testing method disclosed herein.

As contemplated in the present invention, a knife edge is arranged to be brought into engagement with an insulated wire which is resting on an anvil under controlled conditions so that an accelerated evaluation of the cut-through characteristic of the insulation may be made and the test may be repeated with a high degree of consistency with respect to the same type of insulation.

It is accordingly a further more specific object of the present invention to provide a new and improved testing apparatus for determining the cut-through characteristic of insulation on an electrical wire wherein the wire and associated test equipment are operating under controlled conditions.

A still further object of the present invention is to provide a new and improved insulation cut-through characteristic tester which employs a knife edge which is adapted to be brought into engagement with the insulation of a wire to be tested such that the force of the knife moving against the insulation will be gradually applied thereto until a fixed amount is present to ensure that a uniform and controlled force is applied.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there are illustrated and described a preferred embodiment of the invention.

Figure 2:
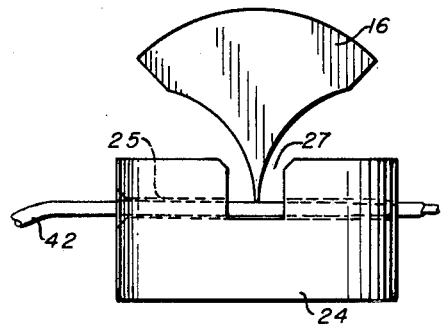
Figure 4:
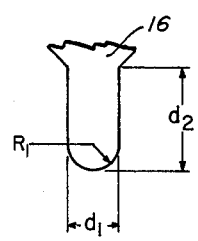
Figure 5:
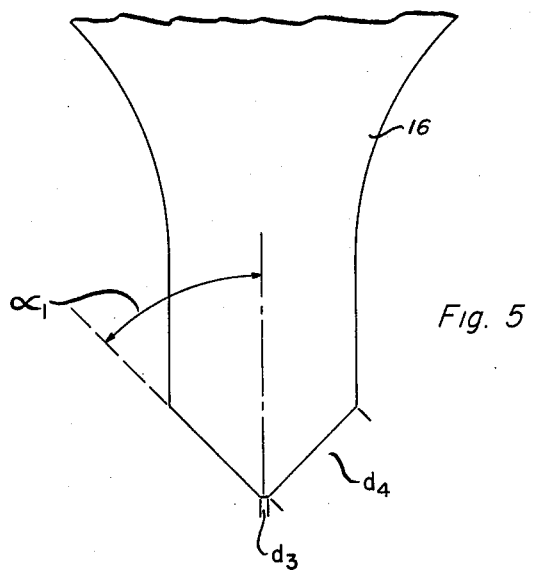
Figure 3:
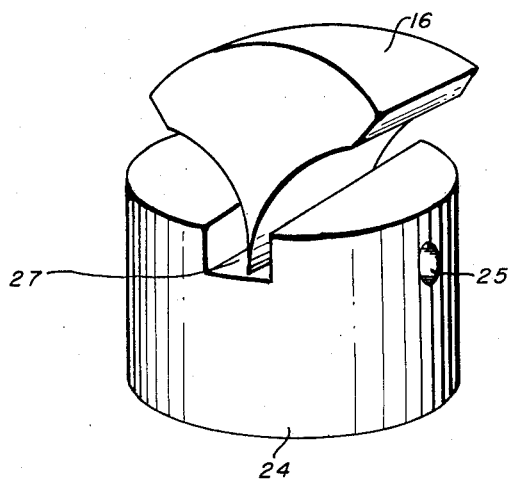
Figure 6:
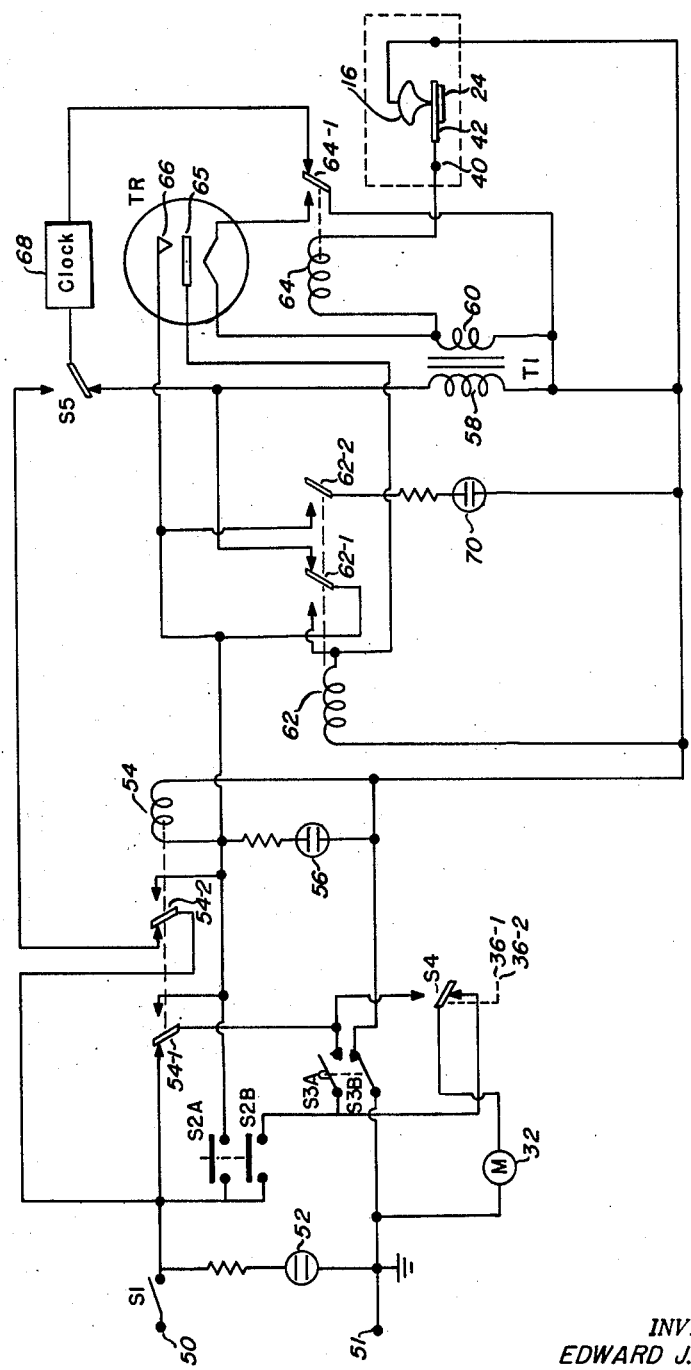

Of the drawings:
FIGURE 1 is a side view of the principal elements of the invention;
FIGURE 2 shows a general detail of the knife and anvil incorporated in the invention;
FIGURE 3 illustrates a perspective view of the knife and anvil apparatus;
FIGURE 4 illustrates the detail of one form of the knife edge;
FIGURE 5 illustrates a modified form of knife edge; and
FIGURE 6 illustrates an electrical circuit which may be used in conjunction with the control of the present testing apparatus.

Referring first to FIGURE 1, the numeral 10 identifies an enclosure within which the present invention is adapted to be mounted. This enclosure may conveniently take the form of an insulated box having the temperature therein appropriately regulated by an electrical heater indicated generally at 12 which has connected in series therewith an appropriate temperature control (TC) 14. Air circulating fans, not shown, may be incorporated within the enclosure to ensure that the temperature distribution is uniform throughout the enclosure.

The heart of the testing apparatus comprises a knife-edge mechanism 16 which is arranged to be rigidly attached to a pivoted beam assembly 18. The beam 18 is pivoted at 19 on a support member 20 which in turn is suitably fastened to a base member 22. The knife edge 16 is arranged to cooperate with an adjustable anvil mechanism including an anvil head 24 and an adjustable base therefor 26. The beam 18 is arranged to be balanced by a suitable counterbalance 28 coupled to the beam by way of a frictionless bearing 29. The mounting of the beam 18 on the support member 20 is by way of the frictionless bearing 19. A weight pan 30 is arranged to be suspended from the outer end of the beam 18 by way of a frictionless bearing 31. A motor 32 is mounted on the base member 22 and is coupled through suitable gear reduction means 34 to a cam 36 having a general heart-shaped configuration. The cam 36 is arranged to cooperate with a cam follower 38 which is mounted on the beam 18. When higher temperatures are to be used in the test chamber, the motor 32 may well be mounted outside the chamber with suitable drive couplings into the chamber.

An electrical terminal means 40 is arranged to be connected to one end of the insulated wire sample that is undergoing tests, the sample being indicated at 42. The sample is arranged to pass through the anvil head 24 so that the insulated portion thereof will be under the knife-edge mechanism 16.

In order to ensure that external factors do not influence the testing operation, the base member 22 may be suitably mounted on shock mountings indicated at 44 and 46.

Before considering the operation of the apparatus of FIGURE 1 in detail, reference should be had to the other figures. Thus, FIGURE 2 shows in expanded detail a preferred arrangement of the knife-edge mechanism 16 and the anvil head 24. It will be noted that the insulated wire 42 is arranged to extend through an opening 25 which passes through the anvil head. A transverse slot 27 is cut into the upper face of the anvil head 24 so that the knife edge 16 can project down into this slot and engage only the insulated wire 42 after it has been threaded through the hole 25. The knife edge is arranged to engage the insulated wire at right angles thereto and must be so positioned to insure uniform results in the shortest time.

The perspective view of the knife-edge mechanism and the anvil head 24 as shown in FIGURE 3 will also serve to show the relationship in depth of the knife edge 16 and the anvil head 24.

The actual dimensions and physical arrangement of the edge of the knife 16 will, of course, depend upon the size of the wire being tested and the insulation which is surrounding the same. In one particular test, the wire size used was a number 24 having an insulation thickness such that the over-all outside diameter of the wire and insulation was approximately 44 mils. With such a wire, a knife edge such as illustrated in FIGURE 4 was utilized in the testing apparatus. The radius of the edge of the knife was 5 mils at a point indicated at $R_1$ in FIGURE 4. The dimension $d_1$ was selected to be 10 mils, while the dimension $d_2$ was selected to be 20 mils.

In another version of the apparatus, the knife edge of the mechanism 16 was arranged to have a flattened end whose lateral flat dimension as indicated at $d_3$ in FIGURE 5 was 3 mils. Extending at the angle $\alpha_1$ from the end edge are a pair of flat surfaces whose dimension was approximately 26 mils. The angle $\alpha_1$ was selected to be 45°.

In each of the edges illustrated in FIGURES 4 and 5, the particular dimensions selected were selected to represent the type of edge that might be encountered by the wire in test in its actual application to an electrical circuit.

It will be apparent from the view of the apparatus shown in FIGURE 2 that if a force is applied to a knife edge mechanism 16 so as to force the edge thereof against the wire 42, eventually the insulation on the wire will give way and the rate at which it gives way will be a function of the cold flow characteristics of the material incorporated in the insulation and the amount of force applied to the knife edge.

FIGURE 6 illustrates a typical electrical circuit for effecting an automatic testing operation using the apparatus shown in FIGURE 1. Included in the apparatus as shown in FIGURE 6 is an input power line by way of input terminals 50 and 51. A suitable power line indicator 52 is adapted to be lit upon the closing of a power line switch S1. A test switch S2A and S2B is included for initiating a testing cycle. A reset switch S3A and S3B is included for purposes of resetting the apparatus to a starting point wherein a new sample of wire can be loaded into the mechanism for testing purposes. A switch S4 is adapted to be associated with the movement of the cam 36 so as to provide the necessary direct control of the motor 32 as it drives the cam for initiating a test operation and also for resetting the apparatus. A test hold relay 54 is included for purposes of holding or storing the fact that a test operation has been initiated by way of the test switches S2. Relay 54 includes a pair of switch blades 54–1 and 54–2, both of which cooperate with a pair of energized and de-energized contacts. A test indicator light 56 is also incorporated for indicating to an operator that the test operation is underway.

Power is supplied to the testing head assembly including the knife edge 16 and the anvil 24 by way of a transformer T1 having a primary winding 58 and a secondary winding 60, the latter having a low voltage output for use with the test circuit that includes the knife edge 16. A power circuit for the primary winding 58 is controlled by way of a failure condition hold relay 62 having a pair of switch blades 62–1 and 62–2 and associated energized and de-energized contacts.

In series with the energizing circuit for the testing assembly is a further relay 64 which is adapted to be energized as soon as current begins to flow in the testing circuit as indicated by the knife edge penetrating the insulation and engaging the wire and the sample being tested. The relay 64 includes a blade 64–1 and an associated energized and de-energized contact. A thermal-relay TR is included in the apparatus and has an associated blade 65 which cooperates with a contact 66 after the heater of the relay has been operative for a predetermined time. A clock mechanism 68 is provided and is adapted to be energized throughout the test until such time as the knife edge has penetrated the insulation on the specimen being tested. The resetting control switch S5 is used for resetting the clock following a test operation. An indicator 70 may be provided for purposes of indicating that a failure condition has been realized in the specimen.

Referring to the over-all operation of the system, reference should be had to both FIGURES 1 and 6. The apparatus as illustrated in FIGURE 1 is in the middle of a test operation. Prior to the starting of a test operation, the cam 36 will normally be rotated 180° from its position as illustrated so that the riser portion of the cam will bear against the follower 38 and pivot the beam 18 in a clockwise direction so that the knife-edge mechanism 16 will be removed from the anvil head 24. At this time, the sample wire 42 may be threaded through the head 24 so that the insulation thereof extends into the opening 27, as illustrated in FIGURE 2. The end of the sample 42 will have the insulation stripped therefrom so that an electrical connection can be made to the terminal 40. At this point, the apparatus is now ready for a test operation to commence. The operator performing a test must decide the particular criteria that he is testing and the rate at which he wishes to bring this test to a completion. The operator will select an appropriate weight W and place it in the pan 30 at the outer end of the beam 18. If the beam is in balance without the weight W being present, it will be obvious that in a frictionless beam assembly, the weight W may be brought to bear in an amount which is directly related to the ratio of the distance between the end of the beam and the pivot point 19 relative to the corresponding distance from the pivot 19 to the edge of the knife-edge mechanism 16.

The operator may now close the switch S1 at which time power is applied to the electrical circuit. Next the operator will depress the test switch S2 so that both the A and the B sections of the switch will close. The closing of the A section will effect an energization of the coil of the relay 54 so that the relay switch blades 54–1 and 54–2 will move to their activated positions to engage the energized contacts. A holding circuit for the relay 54 will be established by way of the blade 54–2 engaging its active contact, this holding circuit including a normally closed contact in the reset switch S3B.

With the closing of the switch S2B, an energizing circuit for the motor 32 is established by way of switch S4 with the blade thereof in the downward position as maintained there by the switching surface 36–1 carried by the cam 36. As soon as hte motor starts to operate the switching surface 36–1 will move the switch blade of the switch S4 into an upward position so that a holding circuit independent of the switch S2B will be established, this holding circuit being traceable through the switch blade 54–2 and its energized contact, the switch blade 54–1 and its energized contact, and the upper contact of the switch S4. As the motor operates, the cam 36 will be rotated and the follower will permit the beam 18 to move in a counterclockwise direction. In one embodiment of the invention, the rate at which the cam was operated was such that it took six seconds from the time that the test started before the cam reaches the dwell point shown in FIGURE 1. This method of lowering the beam and introducing the effects of the weight W upon the knife edge is such as to minimize the effects of any external disturbance and to prevent the rapid motion of the beam from introducing undesired forces at the knife edge which would adversely influence the intended operation of the test. In other words, the apparatus has been so arranged that the effects of any momentum of the beam are eliminated and the only effective force on the knife edge will be the force introduced by the weight acting through beam 18.

When the relay 54 moves to the energized position, the blade 54–1 engages its energized contact and supplies an energizing signal to the primary 58 of the transformer T1 by way of the relay switch blade 62–1 and its associated de-energized contact. With the power applied to the primary 58, the secondary will have a signal thereon and this will be applied through the relay winding of the relay 64 to the terminal 40 which is coupled to the wire of the sample 42. The knife-edge mechanism is coupled to the other side of the primary 58 as well as the secondary 60.

Another operation which is initiated immediately upon the depressing of the test button S2 is the energization of the clock 68 which serves to measure the time that it takes for the cut-through operation to take place. The energizing circuit for the clock includes a switch S2 and, subsequently, the holding circuit including the switch blade 54–2 and its energized contact, the relay switch blade 62–1 and its de-energized contact, as well as the lower contact of the switch S5. The return energization circuit for the clock 68 includes the relay switch blade 64–1 and its associated de-energized contact which is connected to the grounded side of the electrical power circuit.

As soon as the motor 32 is rotated to the position such that the cam 36 appears as shown in FIGURE 1, the switching surface 36–2 of the cam 36 will switch the switch S4 back to the position shown in FIGURE 6 so as to de-energize the motor 32. The apparatus is now functioning in its normal test mode with the weight W acting through the lever arm of the beam 18 to cause the knife edge 16 to bear against the insulation of the test specimen in the anvil head 24. After a predetermined time which will be a direct function of the insulation and the weight W, as well as the temperature of the enclosure housing the same, the knife edge will penetrate through the insulation and contact the wire of the specimen. This will close an electrical circuit such that the relay 64 will now become energized so that its blade 64–1 will switch to the energized position and engage the associated energized contact. This contact will energize the heater of the thermal-relay TR and the movement of the blade 64–1 will open the clock circuit of the clock 68 so that the clock will be de-energized at the instant of break-through so as to give an accurate time measure in the test. A buzzer, light or other indicator, not shown, may also be activated by the operation of the relay 64.

After the thermal-relay has its heater energized for a short time, the blade 65 will engage the contact 66 so as to establish an energizing circuit for the relay 62. When the relay 62 becomes energized, the energizing circuit for the indicator lamp 70 will become operative and the blade 62–2 engage its associated energized contact. Further, the switching of the blade 62–1 away from its de-energized contact will open the energizing circuit from the transformer 58 and will close the holding circuit for the relay 62 so that the same will stay in this locked position until such time as the reset switch S3 has operated. When the primary winding of the transformer T1 is energized, current flowing through the test circuit is cut off so as to avoid any possibility of any pitting or scoring of the knife edge of the test assembly.

The operator may now operate the reset switch S3. When the switch S3 is operated, an energizing circuit is established for the motor 32 and the motor will operate until the switch S4 operates to de-energize the motor 32.

It will be readily apparent that the apparatus described herein is subject to many variations as will be obvious to those skilled in the art. The testing operations which are performed by the apparatus as disclosed have considerably simplified the testing heretofore required and has improved the reliability of the tests to a point which has not been achievable heretofore.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. An insulation cold flow tester for a wire having an insulated covering, comprising an anvil adapted to hold the wire to be tested, a beam, a knife edge positioned on said beam and adapted to be brought into engagement with the insulation on said wire, a beam support member, a frictionaless bearing coupling said beam to said beam support member to restrict the motion of said beam to a single plane, force-producing means comprising a weighted member connected to said beam to bias said knife edge toward said anvil, a cam surface positioned to engage said beam to control said engagement of said knife edge and said insulation, a motor means for driving said cam surface, a clock, means including relay means adapted to energize said clock concurrently with the activation of said motor, means adapted to be connected to the wire on said anvil to indicate when said knife edge has cut through said insulation, said last-recited means comprising an electrical circuit having a power source in series with said wire, relay means for indicating when said circuit is closed, and means including said relay means connected to de-energize said clock.

2. An insulation cold flow tester for a wire having an insulated covering, comprising an anvil adapter to hold the wire to be tested, a beam, a knife edge positioned on said beam, and adapted to be brought into engagement with the insulation on said wire, a support member, a frictionless bearing coupling said beam to said beam support member to restrict the motion of said beam to a single plane, force producing means comprising a weighted member connected to said beam to bias said knife edge toward said anvil, a movable cam surface positioned to engage said beam and to control the movement of said beam and thereby said knife edge toward said anvil, motor means connected in driving relation to said cam surface, timing means, means connected to said motor means and said timing means to activate said timing means as said knife edge is moved toward said anvil, means adapted to be connected to the wire on said anvil and said knife edge to indicate when said knife edge has cut through said insulation, said last named means comprising an electrical circuit having a power source connected thereto, and means responsive to a change in a current condition in said electrical circuit effected by said knife edge engaging said wire to deactivate said timing means.

References Cited in the file of this patent
UNITED STATES PATENTS

| | | |
|---|---|---|
| 2,028,190 | Burns | Jan. 21, 1936 |
| 2,567,333 | Gogan | Sept. 11, 1951 |
| 2,890,585 | Albrecht | June 16, 1959 |
| 2,904,994 | Claxton | Sept. 22, 1959 |